United States Patent [19]

Muenz et al.

[11] Patent Number: 5,554,406
[45] Date of Patent: Sep. 10, 1996

[54] CONGEALED FRUIT CONFECTION ESPECIALLY FOR MAKING FRUIT CLUSTERS

[75] Inventors: David J. Muenz, Akron; Harold J. Hochstetler, Orrville, both of Ohio

[73] Assignee: The J. M. Smucker Company, Orrville, Ohio

[21] Appl. No.: 218,439

[22] Filed: Mar. 28, 1994

[51] Int. Cl.⁶ ............................. A23L 1/072; A23L 1/064
[52] U.S. Cl. .......................... 426/573; 426/577; 426/285; 426/660
[58] Field of Search .................................. 426/573, 660, 426/577, 285

[56] References Cited

U.S. PATENT DOCUMENTS

| | | | |
|---|---|---|---|
| 3,097,951 | 7/1963 | Greninger | 99/134 |
| 4,585,657 | 4/1986 | Karwowski et al. | 426/285 |
| 5,084,296 | 1/1992 | Lugay et al. | 426/573 |

OTHER PUBLICATIONS

Lees et al. Sugar Confectionery & Choc. Manufact. pp. 1–7.
Barnett The Art & Science of Candy Manuf. pp.1–8; 137–145; pp. 195–196.

*Primary Examiner*—Donald E. Czaja
*Assistant Examiner*—Choon P. Koh
*Attorney, Agent, or Firm*—Vickers, Daniels & Young

[57] ABSTRACT

A congealed fruit confection with a high fruit intensity comprising a mixture of a fruit concentrate, natural sweeteners, a softening agent, a humectant, water and pectin of over 1.0% by weight of the mixture where the mixture is congealed in molding material to reduce the water of the mixture to provide a water activity of substantially less than about 0.40.

10 Claims, 5 Drawing Sheets

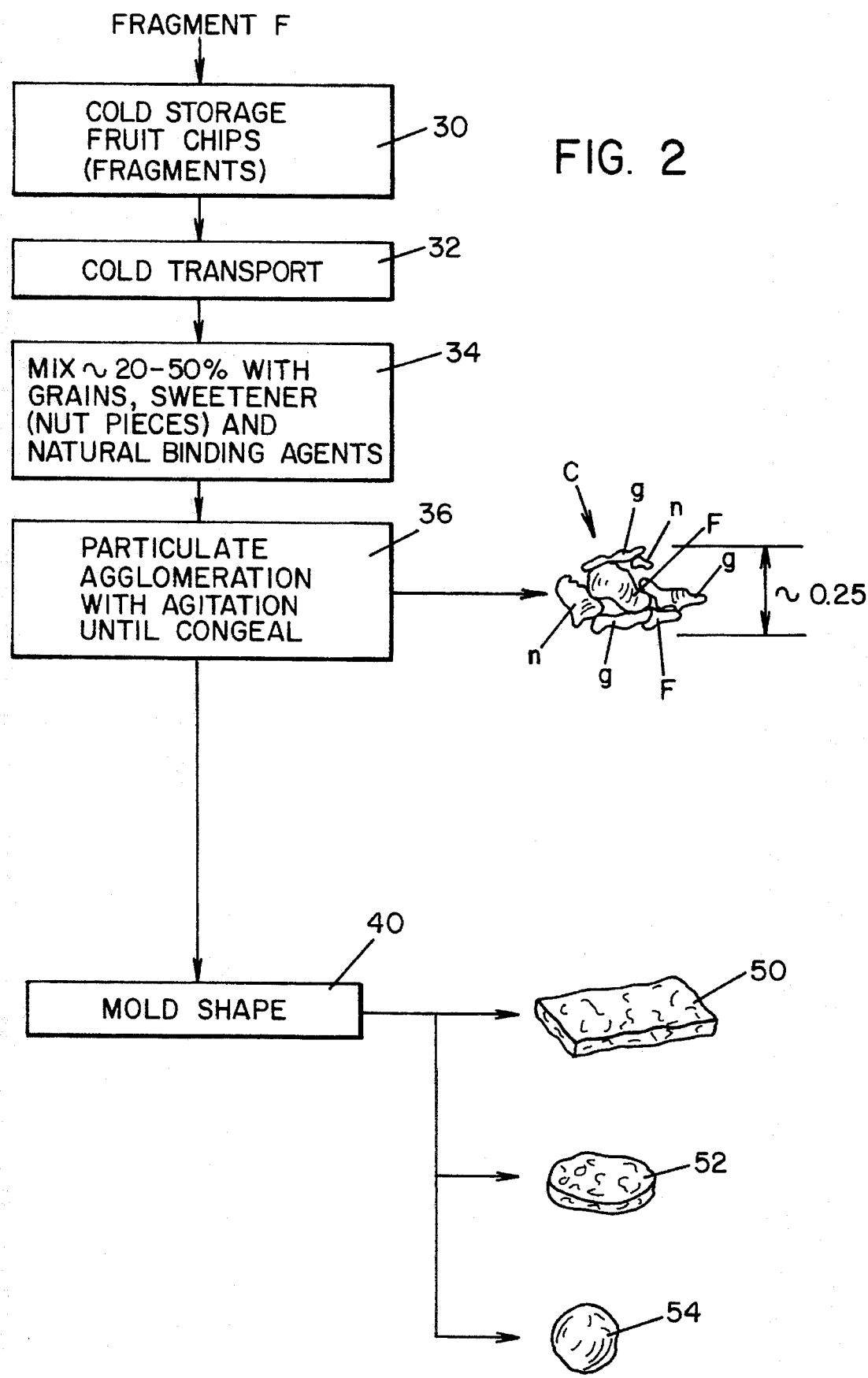

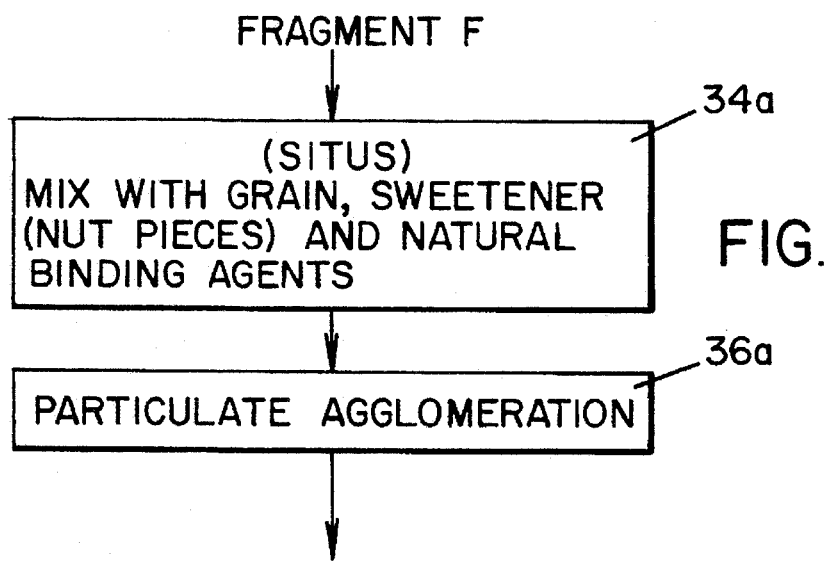
FIG. 2A
FIG. 3A
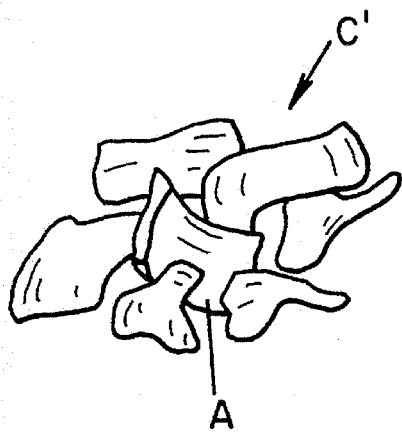
FIG. 3B
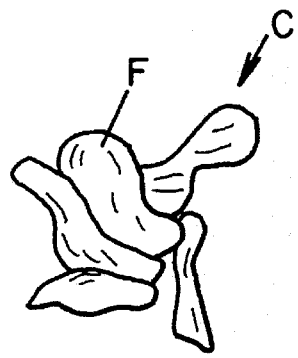

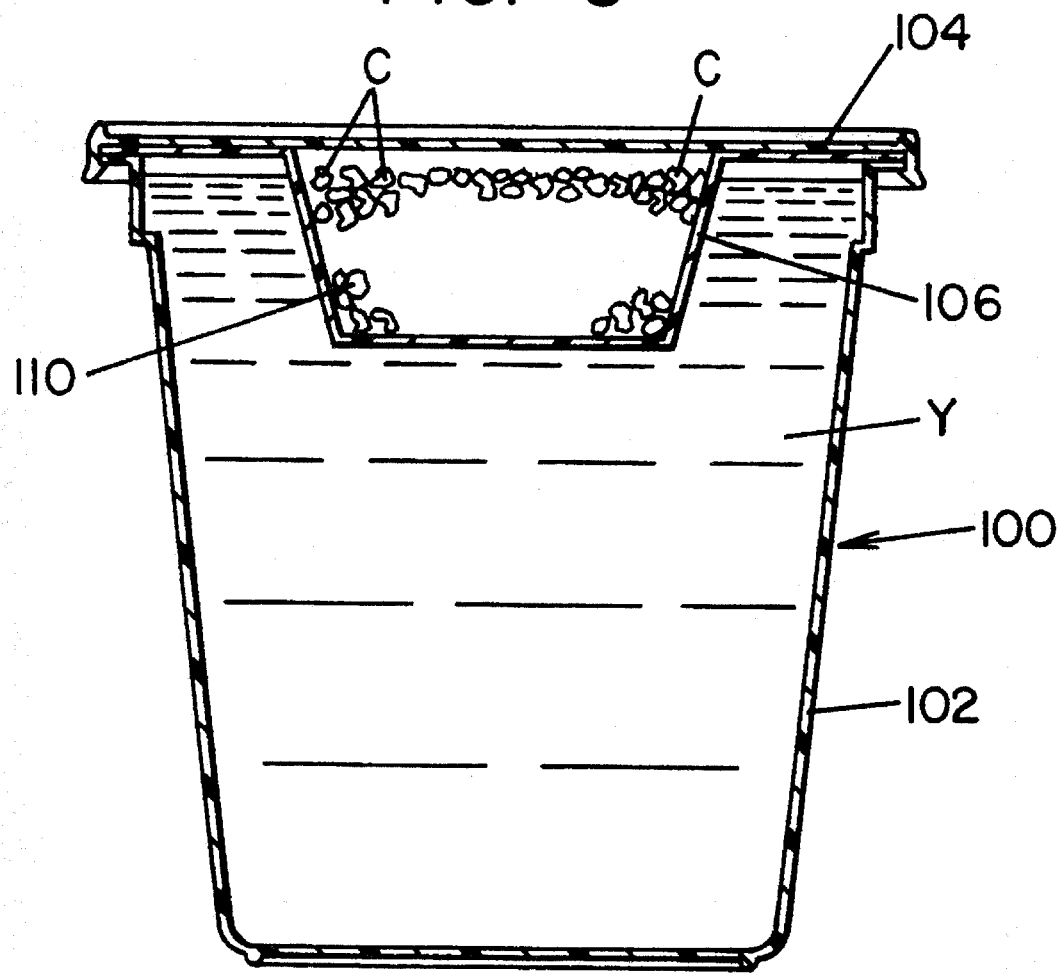

CONGEALED FRUIT CONFECTION ESPECIALLY FOR MAKING FRUIT CLUSTERS

The present invention relates to the art of congealed fruit confections and more particularly to a novel congealed fruit confection especially adapted for making agglomerated clusters of the type which are now used in dry breakfast cereals and other food products.

The invention is particularly applicable to production of a unique congealed fruit confection and the use of this novel confection in a relatively small food cluster made up of a piece or pieces of the congealed fruit confection agglomerated with crisp pieces selected from the class consisting of cereal, grain and/or nuts and a natural binding material, such as honey, and the invention will be described with particular reference to this use and technology; however, the invention has broader applications and may be used for a variety of applications of a congealed fruit confection in various sizes and shapes.

BACKGROUND OF INVENTION

In recent years, a number of breakfast cereals and yogurts have used clusters normally formed from grain, cereal and/or chopped nuts held together with a sweetener or natural binder, such as honey, and agglomerated into relatively small, generally spherical pieces or clusters. By agglomerating grain, cereal and/or chopped nuts with honey, which is common in forming discrete nuggets or clusters, the resulting clusters can be dispersed throughout normal breakfast cereals to produce added fiber and added variety for increased consumer acceptance of the breakfast cereals. These small, generally crisp clusters, spherical bodies or nuggets are well known in the food industry and are also used to produce snack bars, cookies, additives for yogurt. In some breakfast cereals, dry fruit pieces are also added with the dry clusters to provide both fruit and fiber in standard breakfast cereals. The proliferation of uses for cereal, grain and chopped nut clusters has presented one major commercial problem, the solution of which has heretofore escaped the breakfast food and yogurt industry. Clusters of grain and/or chopped nuts agglomerated into small spherical bodies by natural binders, such as honey or sugar, are relatively bland in taste, organoleptic characteristics and chewability. Consequently, breakfast cereals which employ the normal clusters of grain and/or chopped nuts add fruits, almonds and a wide variety of other separate and discrete food particles for totalizing the perceived nutritional characteristics of the breakfast cereal. There is a substantial commercial desire for creating grain, cereal and/or nut clusters with a fruit component; however, the only viable effort in this area has been the use of small pieces of dried apples which are agglomerated with grains and/or chopped nuts into small clusters or nuggets. Such clusters or nuggets .do have a fruit constituent; however, the constituent is no different than adding separate dried apple bits to the cereal. Dried apple bits, whether part of the cluster or separate in the cereal are extremely chewy and have a low release of apple flavor when consumed. Indeed, unless the dried apple bits in the experimental clusters are chewed separately no fruit flavor is released. There is no acceptable way to release a distinguishable fruit flavor, except the apple flavor, which is weak. In summary, there has been no successful procedure for creating the commercially demanded clusters with an acceptable fruit constituent, especially a constituent that can be used for several distinct fruit flavors. Dried apple bits have not been successful because they remain as dry apple bits or pieces with the low fruit release and the inability to produce a flavor, except an apple flavor which is extremely low organoleptically. It is conceivable that other dried fruits could be chopped into small pieces and used in the clusters; however, they would retain their tough texture, difficult chewability, low flavor release and the inability to be agglomerated with grains or chopped nuts by natural binders, such as honey. The use of dried fruit bits would be extremely expensive, produce unacceptable texture and remain no better than using separate dried fruit particles in a breakfast cereal.

The production of granola has included fruit paste; however, the granola must be held together with relatively high fat substances. When such substances are dried they are fragile and can not be incorporated as discrete small clusters including fruit and grain as is demanded for an acceptable and commercially viable fruit clusters.

INCORPORATION BY REFERENCE

As will become apparent, the present invention relates to a congealed fruit confection which is novel in itself, is processed in a novel manner and is incorporated with cereal, grain and/or chopped nuts to produce a fruit cluster. As background technology, it is common practice to produce gelled confections or candies, such as starch or gelatin base gum candy particles. These gelled or congealed confections are produced in relatively small cross sections by using starch and gelatins with weak fruit flavors that are moulded in starch pouches or cavities, whereby the starch withdraws water as the confection is gelled. This procedure reduces the water activity of the confection and allows it to form into a self-sustaining shape which is normally quite small to create a large surface area of contact between the gelled confection and the moulding starch cavity to efficiently withdraw water and render the confection firm. The process dates back many years and is generally described in Greninger 3,097,951, which prior patent is incorporated by reference as background information. Gelled confections using starch and gelatin are produced by the millions and are sold in pouches; however, such confections have a relatively low "fruit intensity", which term is defined as a high ratio by weight of fruit solids to the total weight of the confection. A high fruit intensity is not obtainable by these prior gelled or congealed gum candy manufacturing processes. A high fruit intensity is where the fruit solids in the congealed confection is at least approximately 2–3% of flavor distinguishable actual fruit solids.

THE INVENTION

In accordance with the present invention, there is provided a congealed fruit confection which, in relatively small sizes, has a high fruit flavor release, excellent organoleptic characteristic and a high fruit intensity to give a better flavor delivery than heretofore possible in gelled gum candies, while maintaining an extremely low water activity to preclude migration of moisture from the confection to the grain, cereal and/or chopped nuts combined with this unique confection to produce fruit clusters.

In accordance with the invention, the novel congealed fruit confection, with a high fruit intensity is formed in relatively small discrete bits. These bits can be produced in pieces which, in the preferred embodiment, have preselected molded shapes. The confection comprises a mixture of fruit concentrate, natural sweeteners, a softening agent, a humectant, water and pectin of over 1% by weight of the mixture. The mixture is congealed in a moulding material, such as moulding starch, that can define the preselected shape, whereby the moulding material or starch reduces the water of the mixture to provide a water activity of substantially less than about 0.40. This novel congealed fruit confection is made in accordance with standard gum candy procedure; however, the process differs by using fruit concentrate, sugar and pectin. The fruit concentrate provides a high fruit intensity with fruit solids in the confection being greater than about 2–3%. In accordance with another aspect of the invention, the softening agent is the humectant and is in the form of glycerin that reduces the toughness of the resulting solid confection. The humectant characteristics of the glycerin reduces the water activity of the confection. In accordance with another aspect of the invention, pectin is employed. Prior uses of starch and gelatin mask the fruit flavor that exist in a minor degree in the prior congealed confections of the type to which the present invention is directed. The pectin is the stabilizer for the congealed fruit confection and is advantageous since it produces a cleaner product with a faster flavor release, especially at the low water activity of the finished confection. By placing the mixture forming the congealed fruit confection into a moulding material such as moulding starch, the starch removes water and causes a firmness to be imparted to the congealed fruit confection and substantially reduces water activity. As is common practice, placing the novel mixture into moulded cavities in a starch bed allows the confection to set-up and become stiff. The confection mixture remains in the starch bed or the moulding starch for two to three days. Thereafter, it is removed and coated with carnauba wax, confectioners, glaze or another wax so that the resulting confection bits will not stick to each other. This process is also standard practice in making gummed candy, using starch or gelatin as the stabilizer.

In accordance with the invention, glycerin is used as the softening agent and humectant. A combination of sugar and corn syrup is used as the sweetener. At least about 50% by weight of the mixture is the blend of sweeteners. Consequently, the resulting congealed fruit confection having a high fruit intensity will also have a lower temperature at which the congealed fruit confection metaphorically changes into a solid or glass. This low temperature, which in practice is approximately 0° F., is known as the glassification temperature, below which temperature the novel gelled fruit confection assumes the physical characteristics of a solid which is frangible. Another characteristic of the congealed fruit confection bits is that they have a relatively small cross section so that the confection will congeal and give up a sufficient amount of water over a given time to reduce the water activity of the total volume of the congealed confection. Since the water must be removed from the congealed fruit confection to impart stiffness to the resulting fruit bits, the size of the bits are relatively small. A major dimension of less than 0.75 inches is normally employed in the gum candy technology so far described. If the novel congealed fruit confection, having high fruit intensity and a low water activity, were to be used as discrete candy objects, as opposed to making fruit clusters, a relatively large size could be used. However, the primary commercial objective of the present invention is to produce relatively small fruit clusters having a high fruit flavor release and using cereals, grain and/or chopped nuts. Such clusters are useful as yogurt condiments. This use generally requires clusters having a maximum dimension of about 0.30 inches. Consequently, congealed fruit confections having dimensions approaching 0.75 inches would be too large. Thus, in accordance with another aspect of the invention the congealed fruit confection bits are divided into extremely small pieces. It has been found in the standard moulding starch process the minimum applicable size of the starch cavities receiving the congealable mixture is approximately 0.30 inches. This is still a size which would not allow the congealed fruit confection bits to be formed directly into small clusters, which small clusters form the primary commercial implementation of the present invention.

In accordance with another aspect of the present invention, the congealed fruit confection bits are glassified to a temperature below the glassification temperature. Thereafter, the glassified congealed fruit confection bits are combined with a non-caking agent, such as powdered sugar, starch powder or oat flour. In accordance with this aspect of the invention, the glassified bits and non-caking agents are introduced into a mechanical chopping or slicing device, such as a food processor. In practice, an Urschel Comitrol is employed. As the bits are fractured into small particles or fragments, they are coated with the non-caking agent. This process produces individual jagged fragments or "chips" coated with the non-sticking agent so that they will remain separate and distinct. After the mechanical fracturing, the fruit fragments, or chips, if they are not being used at once, are again cooled to a temperature near the glassification temperature and preferably below the glassification temperature.

In accordance with another aspect of the invention, the coated fragments or chips of the fragmented congealed fruit confection bits are used as one constituent in a particulate agglomeration and agitation process, with grains, such as crisp rice or rolled oats, and natural binders, such as honey, to produce small clusters having a general particle size of about 0.25 inches. The small fragments or chips have an overall dimension of less than about 0.15 inches so the fruit constituent of the agglomerated clusters is not overbearing as in the case of dried apple bits and merely nestles internally within the cluster to produce a burst of fruit flavor when the cluster is eaten. The fragments or chips of congealed fruit confection comprise about 25% of the total volume of fruit clusters.

In accordance with the preferred embodiment of the invention, the congealed fruit confection is formed into discrete bits by mixing the ingredients and heating the mixture to a given temperature which in the preferred embodiment, is approximately 170° F. The heated mixture is deposited into discrete cavities in a moulding starch bed. The bits could be formed by utilizing various technologies. For instance, a flat sheet of a heated mixture could be deposited onto a generally flat moulding starch surface. The moulding starch removes water to reduce the water activity of the congealed confection. Thereafter, the flat sheet is cut into desired bits with a general size for subsequent processing. In a like manner, during the congealing process the heated mixture can be extruded, like licorice strips, while removing water to reduce the water activity with subsequent cutting of the extruded congealed fruit confection strip. Irrespective of the standard process used, the fruit concentrate is congealed into a firm particle which is referred to herein as a "bit". The bit is then cooled below the glassification temperature of the congealed confection and fractured into "fragments" and/or "chips". These small particles referred to herein as "fragments" or "chips" are then agglomerated with appropriate dry foods, such as cereals, grains and chopped nuts by using honey and other natural binders. The water activity of the congealed fruit confection is substantially less than 0.40. When agglomerated into a small cluster, equalization of the water activity takes place with the total water activity of the cluster being substantially less than 0.30 and preferably about 0.20. Since the fragments or chips have a low water activity, which may approach 0.20, the grain, cereal, or chopped nuts do not become soggy when combined with the fragments or chips to form small nuggets or clusters. Consequently, the high fruit intensity fragments or chips maintain the crispness of the clusters in a manner at least as efficiently as dried apple bits; however, because of the general softness of the fragments or bits the fragments or bits fit more uniformly and unnoticed into the fruit clusters. The inherent stickiness of the fragments or chips assist in the agglomeration process.

The primary object of the present invention is the provision of a small fruit cluster having a fruit constituent, which cluster can be formed of a variety of fruits, has a low water activity and a high fruit intensity to produce a fruit flavor release many times more powerful per unit weight than heretofore obtainable.

Still another object of the present invention is the provision of a fruit cluster, as defined above, wherein the fruit constituent has a soft texture, is not chewy, releases tremendous flavor and does not distract from the crispness of the remaining constituents of the cluster, which constituents are selected from the class consisting of cereals, grains, nuts and mixtures thereof.

Still a further object of the present invention is the provision of a congealed fruit confection bit having a high fruit intensity and a low water activity.

Still a further object of the present invention is the provision of a confection bit, as defined above, which confection bit includes pectin as the stabilizer, instead of starch and/or gelatin.

Yet another object of the present invention is the provision of a confection bit, as defined above, which confection bit includes pectin of greater than 1%, which level is at least about twice the pectin level used in standard jellies.

Still a further object of the present invention is the provision of a method for producing fruit chips having a dimension less than about 0.15 and formed from a congealed fruit confection bit which has a glassification temperature, is cooled below its glassification temperature and then mechanically fractured into its small particulate shape.

Another object of the present invention is the provision of chips as defined above, which chips are incorporated with a food product selected from the class consisting of cereals, grains, nuts and mixtures thereof, to produce a small fruit cluster having a high fruit flavor release.

Yet another object of the present invention is the provision of a congealed fruit bit which has a high percentage of pectin and a low water activity. This bit can be formed in discrete molded shapes from moulding starch cavities or form into other pieces by cooling the heated high pectin mixture while removing water to reduce the water activity.

These and other objects and advantages will become apparent from the following description taken together with the accompanying drawings.

BRIEF DESCRIPTION OF THE DRAWINGS

FIG. 2 is a flow chart showing the use of the fragments or chips to make clusters, bars, spheres, and/or wafers;

FIG. 2A is a flow chart showing an alternative to the process illustrated in FIG. 2;

FIG. 3A is a pictorial view illustrating an attempt to incorporate fruit into a small food cluster utilizing pieces of dried fruit, which is not prior art but shows an advantage of the present invention;

FIG. 3B is a view similar to FIG. 3A showing the present invention used in a small food cluster;

PREFERRED EMBODIMENT

Figure 1:
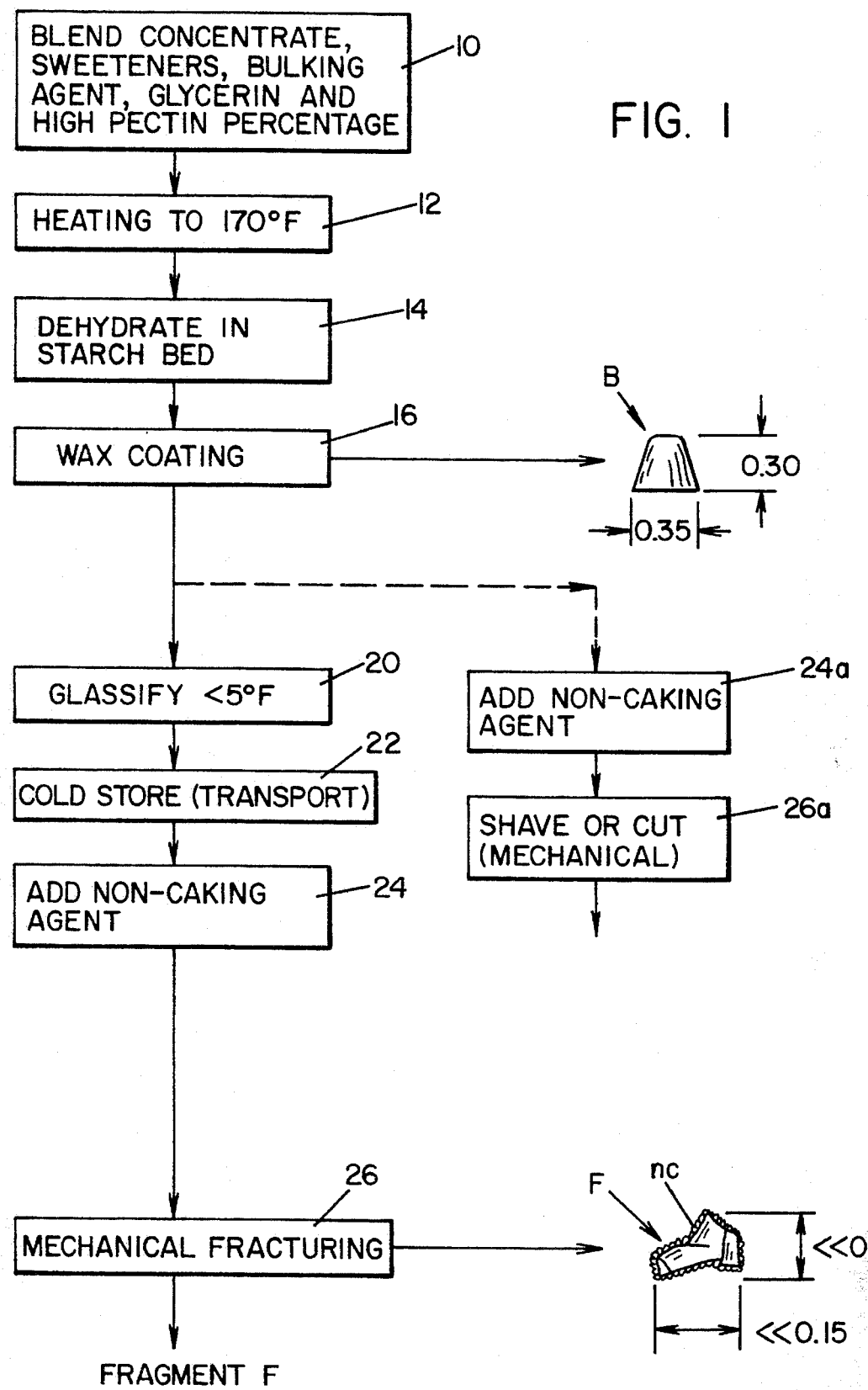
FIG. 1 is a flow chart illustrating the preferred embodiment of the present invention for making galled fruit confection bits and producing fragments or chips therefrom.

Referring now to the drawings wherein the showings are for the purpose of illustrating the preferred embodiments of the invention and not for the purpose of limiting same, FIG. 1 is a flow chart illustrating the procedure for producing a congealed fruit confection that is particularly applicable for making small fruit clusters. The first step is blending a fruit concentrate, sweeteners, a bulking agent, glycerin and a high percentage of pectin. In practice the pectin is the standard high methoxyl pectin (slow set HM or extra slow set HM) available from various commercial sources. The mixture is set forth in the following table:

| Ingredient | Pounds | Percentage |
| --- | --- | --- |
| Blueberry Puree Concentrate | 112.33 | 11.2 |
| Sugar | 313.00 | 31.3 |
| Corn Syrup | 203.00 | 20.3 |
| Citric Acid | 11.50 | 1.2 |
| Glycerin | 120.00 | 12.0 |
| Maltodextrin | 35.00 | 3.5 |
| Sodium Citrate | 4.60 | .5 |
| Natural Flavors | 15.00 | 1.5 |
| Pectin | 12.50 | 1.2 |
| Water | 173.07 | 17.3 |
| Total | 1000.00 | 100.0 |

In the above example, the pectin is 1.20% of the mixture blended in accordance with block 10 shown in FIG. 1. The fruit concentrate is, in the illustrated embodiment, blueberry puree; however, various fruit concentrates could be employed. In the example, the concentrate is 11.2% of the mixture and is about 30% fruit solids. Consequently, the mixture has a high fruit intensity with at least 2–3% fruit solids with a distinguishable fruit flavor to develop an intense flavor release of the resulting congealed fruit confection. Some candies use fruit juices as a sweetener without any special flavor. The use of such a high percentage of fruit solids with a distinguishable fruit flavor creates a high fruit intensity for the resulting confection that is not obtainable in normal starch and gelatin based congealed confections. In accordance with the illustrated embodiment, the sweetener profile includes about 30% sugar and 20% corn syrup. It has been found that this blend of sweeteners is beneficial and produces a sharp glassification temperature for subsequent glassifying and fracturing of the resulting congealed fruit confection. The maltodextrin is a bulking agent while the sodium citrate, citric acid and natural flavors are somewhat standard ingredients of jellies, as well as various congealed fruit confections. As stated previously, a novel feature of the congealed confection itself relates in the high percentage of pectin as a stabilizer with the sugar blend and glycerin. In the present invention, the amount of pectin is greater than 1.0%. This produces a congealed fruit confection in solid form that has a high shelf life due to low water activity and is compatible with dry cereals for forming small clusters. The high fruit intensity produces an intense flavor release. Glycerin is added to reduce the toughness of the congealed fruit confection probably by molecular lubrication. In addition, glycerin is a humectant and reduces the water activity of the resulting congealed fruit confection. The words "fruit intensity" involves the ratio of the percentage of fruit solids to the total weight of the resulting congealed confection. The percentages employed in the preferred embodiment of the invention as set forth above are representative in nature and may be adjusted by a person skilled in the art to obtain the desired characteristics of the present invention. The use of pectin and glycerin together with a high fruit intensity results in the improved congealed fruit confection of the present invention. As illustrated by block 12, the mixture is heated to a temperature above about 170° F. An advantage of the present invention over starch based congealed gum confections is that there is no requirement for cooking the mixture. This drastically reduces the processing time to produce a congealed fruit confection which has a higher fruit intensity and better organoleptic characteristics than prior congealed gum candies without increasing the water activity of the resulting product. The heated mixture is then congealed while water is extracted to produce a low water activity and a firm consistency for the confection. In the preferred embodiment of the invention, the heated mixture is poured into discrete cavities in a standard moulding starch bed. These cavities have the shape of the resulting bit B shown in FIG. 1. This bit has a diameter of about 0.35 inches and a height of about 0.30 inches. These dimensions are about the smallest dimensions which can be obtained in a moulding starch process. The mixture is retained in the starch cavities for two to three days so that water is extracted by the starch from the confection to reduce the water activity of the bit B. In practice, these discrete bits formed in cavities have a transverse or largest dimension less than about 0.50 inches. This allows a large surface area, in contact with the moulding starch, to extract water efficiently from the mixture as it is being congealed into a firm bit B shown in FIG. 1. Bit B is about the smallest that can be produced and has a weight of about 0.75 grams. In practice, bit B has a coating of confectioner's glaze or wax, which preferably is carnauba wax. This wax covers the surface of bit B and prevents sticking of adjacent bits B. Consequently, the bit B is a high fruit intensity confection bit which could be marketed in the form of bit B as a gum candy; however, the preferred use of the present invention is the formation of a fruit cluster. Other procedures can be used for producing the congealed fruit confection in shapes about the size of bit B. A flat congealed confection that is cut into small shapes similar to the size or volume of bit B. Extrusion is also possible with slicing into the desired size. All of these processes still result in a congealed fruit bit which is greater in size than useful for producing small clusters, such as the type of clusters used in yogurt or breakfast cereals. The bit B coated with wax, as indicated by block 16, can be further particulated by another process which forms an aspect of the present invention.

Referring now to blocks 20–26, block 20 is a process step of glassifying bits B or other discrete pieces of the congealed fruit confection. By including a high percentage of natural sweeteners about 50% by weight, the bits B do not freeze; however, they are formed into a glass like structure at a low temperature which in practice is approximately 0° F. Thus, in accordance with an aspect of the invention, bits B are cooled to below the glassification temperature which is less than about 5° F. In this glassification condition, bits B act as if they were bodies of frangible glass. Bits B with a wax coating, in the preferred embodiment, are again cooled and stored in a cold compartment represented by block 22. This maintains the glassification condition of bit B for transportation, if it is necessary or desirable to ship the glassified bits to another location. The glassified bits are mixed with a non-caking agent, such as powdered sugar, starch powder or oat flour. This process step is represented by block 24. Thereafter, glassified bits B are removed from the low temperature storage and fed into an appropriate mechanical chopper or slicer. This storage temperature represented by block 22 is less than the glass transition temperature, or glassification temperature, of fruit bits B. In accordance with the preferred embodiment, the storage temperature is less than 0° F. The mechanical chopping or slicing equipment found to be the most desirable at the present time is an Urschel Comitrol or a standard food processor. Bits B are mechanically fractured, as indicated by block 26, into relatively small fragments or chips F, with a non-caking coating nc as shown in FIG. 1. These fragments or chips have a maximum dimension of less than about 0.15 inches and are jagged in configuration, but are coated with a non-caking agent so that they remain as discrete pieces of the congealed fruit confection.

In accordance with an alternative of the present invention, bits B coated with wax can be mixed with a non-caking agent as represented by block 24a and then shaved or cut mechanically as indicated by block 26a. This will produce chips of a small size of the fragments F with a non-caking coating nc for subsequent use in fruit clusters; however, it has been found that the process of glassification and then mechanical fracturing of bits B is preferred. Irrespective of the particulation process, the congealed mass of high fruit intensity confection is reduced to a size substantially less than 0.15 inches as shown with respect to fragment F in FIG. 1. This fragment, or chip, however particulated, is useful in producing small fruit clusters. The pectin content of bits B is increased when water is withdrawn from the bit as it is being congealed. The pectin is normally greater than 1.25% in the mixture and approached 1.5% in the resulting congealed confection.

Referring now to FIG. 2, the particulated congealed fruit concentrate illustrated as fragment F in FIG. 1, or a sliver or other type chip produced by block 26a is stored in a cold compartment shown as block 30. These fragments or chips are coated with a non-caking agent nc so that they remain discrete particles; however, these fragments should not be stored in large bulk wherein the weight of the mass could compress or even recongeal the fragments or chips. Transportation of the cold fragments or chips is illustrated by block 32 where they are small pieces which are mixed with food products selected from the class consisting of cereals, grains, chopped nuts or mixtures thereof with other food substances, such as natural binders and additional flavors or sweeteners. These fragments or chips, in an amount of 20–50% of the total weight of the mixture, are brought together as indicated by block 34 into a moist constituent which is particulated by an agglomeration process with agitation and circulation until they are formed into a small fruit cluster such as represented by cluster C as shown in FIG. 2. This cluster agglomeration process is well known in the art and is used for producing breakfast cereal clusters and other similar small clusters for the food industry. The process of forming the cluster C can take a variety of forms and does not constitute a part of the invention, although the formation of the cluster itself is an aspect of the invention. This agglomeration procedure is illustrated as block 36. Cluster C, as shown, includes two discrete portions of fragments F combined with chopped nuts n and flakes of grain g. This cluster is preferably about 25% fruit fragment F and the remainder binder, sweeteners, grain, chopped nuts, flakes, cereals, etc. The overall size of the cluster is about 0.25 inches. This cluster is crisp and easily chewable with an intense fruit flavor profile. The cluster has an overall dimension of between 0.25–0.75 inches. In practice the dimension is approximately 0.25. The water activity, as equalized with the dry components and honey, is about 0.20. Since the water activity of fragments or chips F is relatively low, the oats, crisp rice, chopped nuts and other dry food products do not become soggy or lose their crispness in the fruit and grain cluster C. Only a small amount of honey is used as a binder. This cluster will have a long shelf life and will not cause sogginess in dry breakfast cereal or in other food products. As indicated by block 40, cluster C can be formed into a flat bar 50, cookie or wafer 52 or a spherical ball 54. An alternative process in accordance with the present invention is illustrated in FIG. 2A where the chip or fragment F as illustrated in FIG. 1 is immediately mixed with the grain, sweeteners and other constituents of the cluster C as illustrated in box 34a which mixture is then agglomerated as previously described and as illustrated in block 36a. This alternative process does not require cold storage of the small pieces and can be used when the chip or fragment F is formed adjacent the agglomeration process equipment.

Figure 4:
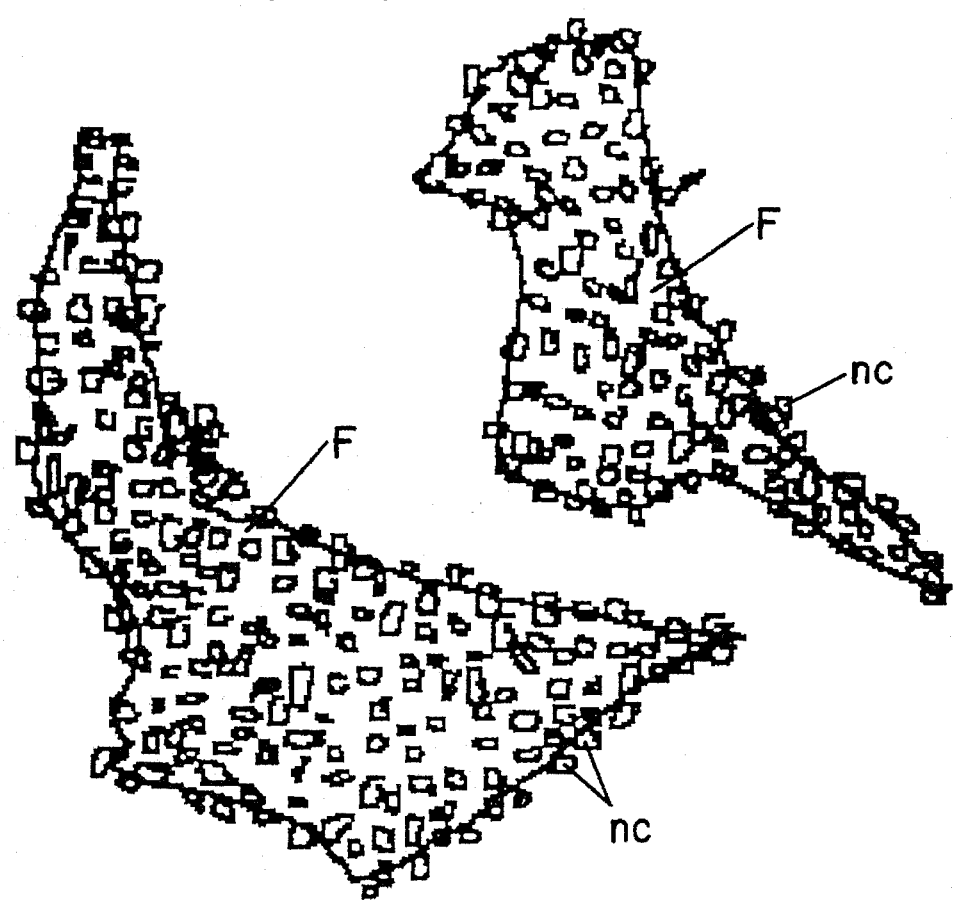
FIG. 4 is a magnified view of fragments formed by the preferred embodiment of the invention; and, FIG. 5 is a cross-sectional view of a yogurt container showing fruit clusters of the present invention in a separate compartment of the yogurt container.
Figure 4:
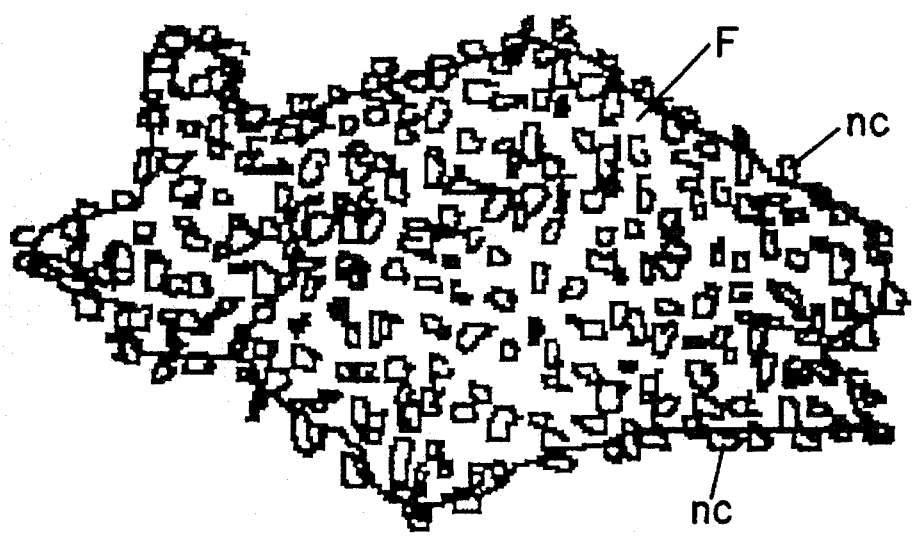

In FIG. 3A a cluster C' is formed with a piece of dried apple A. Although this is not prior art to the present invention, the cluster C shown in FIG. 3B including fragments F is a drastic improvement over the cluster C'. In cluster C', apple piece A retains its distinct chewy consistency and has a different texture than the crisp grains or cereals forming the cluster. By using the present invention, fragments or chips F merely impart intense fruit flavor without distracting from the crispness and texture of the primarily dry cluster by giving two separate organoleptic characteristics. Before the present invention, only dried fruits were anticipated for use in fruit clusters. This process was extremely expensive and did not change the chewy consistency of the dried fruit which was detectable by the consumer. In FIG. 4, fragments F with coating particles nc are shown as seen through a microscope.

Referring now to FIG. 5, the first commercial application of the present invention is illustrated. A yogurt cup 100 includes yogurt Y in a receptacle 102 having an upper sealed lid 104. Compartment 106 receives a supply 110 of clusters C constructed in accordance with the present invention. A consumer removes the cluster C and mixes them within yogurt Y after purchasing the container 100. In the agglomeration process, honey, brown sugar and corn syrup is combined to control texture of the resulting cluster after it has been agglomerated and dried. This has less than 0.5 grams of fat per serving and approximately 40 calories per gram of finished cluster. Thus, the cluster is classified as "fat free" by the FDA. Cluster C is quite crisp. The stickiness of fragment F assists in the agglomeration process without adversely affecting crispness or the remaining constituents. Particulation of the bits B into the small fragments F could be done with other fruit confections such as a confection without glycerin. Indeed, it may be possible when using starch and/or gelatin; however, the invention is a unique congealed fruit confection and method of processing congealed fruit confections in general. The preferred starting material of the methods is the unique confection of the present invention. It has been found that starch in prior confections has a tendency to mask flavor. Pectin gives a cleaner and faster flavor release especially at low water activity. Wax is not used on the fragments F because this will adversely affect subsequent agglomeration into clusters C.

Having thus defined the invention, the following is claimed:

1. A congealed fruit confection with a high fruit intensity in the form of a bit, said confection comprising a mixture of a fruit concentrate containing at least about 2% fruit solids, at least about 50.0% sweeteners selected from the group consisting essentially of sugar, corn syrup and mixtures thereof, a softening agent and a humectant comprising essentially of glycerin wherein said glycerin making up at least about 10% of said confection, water and pectin of over 1.0% by weight of the mixture, which mixture has been congealed in molding material, said molding material reducing the water of said mixture to provide a water activity of substantially less than about 0.40.

2. A fruit confection bit as defined in claim 1 wherein said sugar is at least 50% greater in weight than said corn syrup.

3. A fruit confection bit as defined in claim 1 wherein said pectin is at least 1.25% by weight of said confection bit.

4. A fruit confection bit as defined in claim 1 wherein said molding material is starch.

5. A fruit confection bit as defined in claim 1 including a non-stick coating on said bit.

6. A fruit confection bit as defined in claim 5 wherein said coating is carnauba wax.

7. A fruit confection bit as defined in claim 1 which has been subdivided mechanically into fruit chips with a maximum dimension of about 0.10 to 0.15 inch.

8. A fruit confection bit as defined in claim 7 which has been subdivided mechanically into fruit chips and agglomerated with a dry food product selected from the class consisting of cereals, grains, nuts and mixtures thereof.

9. A method of making a congealed fruit confection including the steps of:

blending fruit concentrate, at least about 50% by weight sweeteners selected from the group consisting essentially of sugar, corn syrup and mixtures thereof, at least about 10% by weight glycerin, water and at least 1.0% by weight pectin to form a fruit mixture, said fruit mixture including at least 2% by weight fruit solids;

(b) heating said fruit mixture to at least a given temperature below the boiling point of said mixture;

(c) depositing said heated fruit mixture on moulding starch;

(d) allowing said starch to remove water from said fruit mixture to produce a congealed fruit mass with a water activity less than 0.40;

(e) forming said congealed fruit mass having a minimum dimension of at least about 0.30 inch;

(f) cooling said congealed fruit mass to a temperature below the glassification temperature of said congealed fruit mass, said temperature less than said glassification temperature being less than 0° F.;

(g) adding a non-caking agent to said congealed fruit mass; and, (h) mechanically fracturing said congealed fruit mass into fragments of less than about 0.10 to 0.15 inch.

10. A method as defined in claim 9, including the step of:

(i) agglomerating said fragments with a dry food selected with the group consisting of cereals, grains, nuts and mixtures thereof.

\* \* \* \* \*